UNITED STATES PATENT OFFICE.

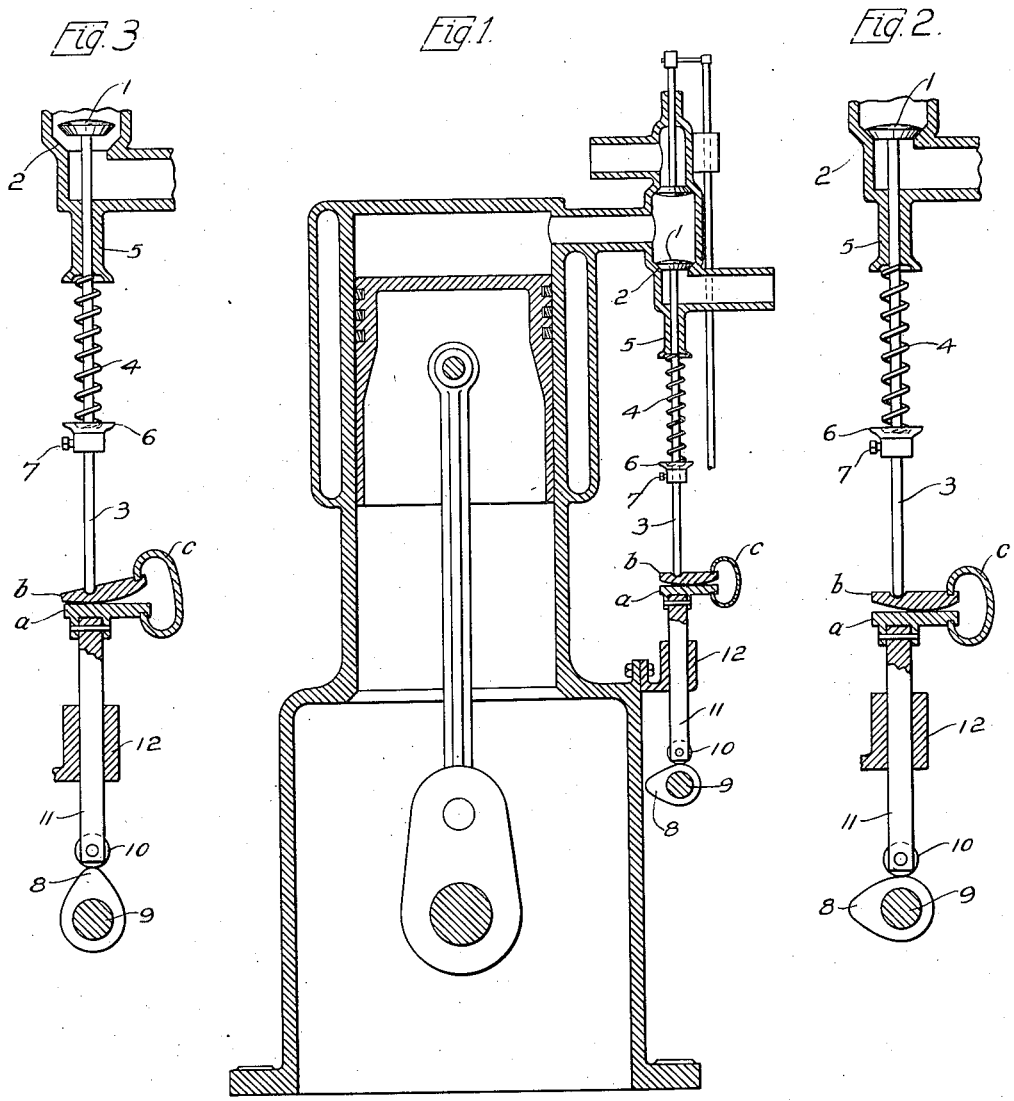

FRANK W. MERRICK, OF BOSTON, MASSACHUSETTS.

VALVE-MOTION FOR EXPLOSIVE-ENGINES.

1,259,263. Specification of Letters Patent. Patented Mar. 12, 1918.

Application filed September 15, 1914. Serial No. 861,911.

*To all whom it may concern:*

Be it known that I, FRANK W. MERRICK, a citizen of the United States, residing at Boston, in the county of Suffolk, State of Massachusetts, have invented a certain new and useful Improvement in Valve-Motions for Explosion-Engines, of which the following is a specification, reference being had therein to the accompanying drawings.

The invention has relation more particularly to puppet valves and the operating means therefor, such for instance as are employed in explosive engines. The general object of the invention is to obviate slamming and noise in the operation of such devices. The invention consists, in general, in an improved valve-motion having provisions for maintaining continuous contact, with the valve-actuator or valve-operating cam, of the part which is engaged thereby for the actuation of the valve, and eliminating looseness and play intermediate the actuator or cam and the valve proper. I thereby avoid the rapping or slamming and noise which in existing valve-motions are incident to renewal of contact between the cam and the part which is engaged thereby, following a separation of the same from each other, or due to closing together of other parts intermediate the cam and the valve proper following a separation of such parts from each other.

By way of making clear the nature of my improvement, I may state that in practice it is usual in valve-motions as heretofore constructed to provide for a space or interval somewhere between the valve-actuator or cam and the valve proper to allow for full contact of the valve with its seat, and satisfactory seating in the closing action. This has the drawback or disadvantage that following the opening of an actual space between parts of a valve-motion at the time of the closing of the valve against the seat, the coming together or meeting of the separated parts as the valve-actuator or cam acts in once more opening the valve produces more or less shock and more or less hammering noise. The general aim of the invention is to provide for eliminating the shock and noise without interfering with the proper seating of the valve.

Broadly stated, I attain the general aim just mentioned by the provision of means of taking up all looseness and play between a valve and the actuating device or cam therefor, and causing what for convenience may be termed the cam-follower to remain continuously in engagement with the actuator or the surface of the cam, so that there shall be no separation of parts followed by a closing together with shock and noise at any time between the actuator or cam and the valve proper. More specifically stated, I combine with the actuator or cam and the valve what may be described as a yieldingly-acting expansion-joint providing for keeping the cam-follower in continuous engagement as aforesaid, and for taking up in yielding manner all slack or looseness between the actuator or cam and the valve, at the same time permitting the proper closing of the valve against its seat. In the preferred form of embodiment the expansion-joint in question includes a rocking member or shoe which is actuated by spring-tension tending to effect a rocking of the said member or shoe so that as a result of the rocking the cam-follower shall be kept in touch with the valve-actuating cam, and all slack or looseness intermediate the cam and the valve proper shall be taken up. The construction is such, in the said preferred form of embodiment, that as the cam begins to act with a tendency to open the valve the cam-pressure first occasions a preliminary rocking in reverse direction of the rocking member or shoe, until at a certain point in the rocking the joint becomes operative to transmit in a positive manner the impulse derived from the cam, so as thereby to open the valve.

I have shown an application of my invention in its preferred form of embodiment in the drawings, in which latter,—

Figure 1 shows in vertical section certain portions of an engine having combined therewith my invention in the said preferred form of embodiment.

Figs. 2 and 3 are sectional views on an enlarged scale of the valve-motion detached, showing the parts in different positions.

Having reference to the drawings,—

The valve is marked 1, its seat being marked 2, and the valve-stem is shown at 3. An expanding spiral spring 4, which surrounds the valve-stem 3 between a fixed part 5 of the engine frame and the collar 6 that is fastened by a clamping screw 7 upon the valve-stem 3, acts in usual manner with a tendency to keep the valve proper closed against the valve-seat and to press the cam-follower toward the valve-actuating cam 8, which is fixed upon the rotating shaft 9. In the present instance, the surface of the cam 8 engages a roller 10 that is in pivotal connection with the slide-rod, plunger, or push-rod 11 working in a guide 12 in connection with the engine-frame. The expansion-joint to which reference has been made and in which my invention more immediately resides is combined with the slide-rod, plunger, or push-rod 11 and the valve-stem 3 in the present embodiment of the invention, and interposed between the two, it serving as a medium of connecting and combining them for the proper actuation of the valve through the agency of the cam, and also serving for the attainment of the results above set forth.

The expansion-joint comprises a head $a$ that is fixed upon the upper end of the slide-rod, plunger, or push-rod, a shoe $b$ interposed between said head and the valve-stem, and a spring $c$ engaging with the respective members $a$, $b$. The shoe $b$ is engaged with the valve-stem in manner permitting the said shoe to rock relative to the valve-stem and upon the head $a$. In the present instance the shoe is formed with a recess in its top receiving the rounded lower end of the valve-stem. The shoe $b$ is combined with the head $a$ in manner providing for rocking of the said shoe relative to the head $a$, and for resulting shifting of the point of contact or engagement between the two. In the present instance the head $a$ has an upper surface which extends transversely at right angles to the axes of the plunger or slide-rod and valve-stem. Since the said axes are vertical the said surface is horizontal. The rolling or rocking of the shoe upon the head is provided for by making one or both of their contacting surfaces convex, so as thereby to produce tangential engagement of such surfaces with each other. In the drawings, the under surface of the shoe has the convexity. By the action of the spring $c$ the shoe normally is held rocked so that the outer portions of the shoe and head are closed together and the inner portions thereof are separated as in Figs. 1 and 2, until all looseness or slack between the cam and the lower end of the valve-stem is taken up. The tension of the spring $c$ is less than that of the valve-closing spring 4, so that the spring $c$ shall act merely to rock the shoe sufficiently to take up the slack or looseness between the cam and the valve, and hold the roller 10 against the surface of the cam 8, without raising the valve 1 from its seat 3. The rocking shoe is in effect a spring operated lever which is in continuous engagement with the parts between which it is interposed. As the lifting portion of the cam acts against the roller 10 for the purpose of moving the valve 1 from its seat 3, the first effect is to overcome the resistance of the spring $c$ and cause the shoe $b$ to rock or roll upon the head $a$ so that in virtue of the rocking or rolling movement the point of contact between the head and the shoe shifts into line or approximately into line with the valve-stem 3, as in Fig. 3. In the latter relation the impulse which the cam transmits through the plunger or push-rod 11 becomes effective in communicating through the shoe without idle motion or play a positive push by which the valve is moved from its seat or opened. As the receding portion of the cam enables the spring 4 to effect the closing of the valve, the expansion-joint by acting expansively between the valve-stem 2 and the plunger or push-rod 11 causes the roller 10 to follow the surface of the cam 8, thereby keeping the said roller in continuous engagement with the said surface, in addition to keeping all slack or looseness between the cam and the valve proper taken up, thus attaining the objects of the invention.

The form of the spring $c$ and the manner of its engagement with the members $a$, $b$, of the expansion joint may vary more or less in practice. The preferred form, etc., comprise a spring of C-shape having its extremities engaged in recesses in the upper and under surfaces of the shoe and head $a$ respectively at the outer ends of said shoe and head, as shown in the drawings.

I claim as my invention:—

1. A valve-motion containing a valve which is permitted to adjust itself to the seat in closing, an actuator, and an expansion member which takes up the slack between the actuator and the closed valve and under the pressure produced by the actuator rocks until it reaches thrusting position and thereupon acts positively to open the valve.

2. A valve-motion containing a valve which is permitted to adjust itself to its seat in closing, a valve-cam, and an expansion member which takes up the slack between the actuator and the closed valve and under the action of the cam rocks until it reaches thrusting position and thereupon acts positively to open the valve.

3. The combination with a valve and an actuator, of an interposed expansion member which by a rocking motion expands to take up slack or looseness between valve and actuator until it arrives at thrusting position and then operates to positively actuate the valve to open the latter.

4. A valve-motion containing a valve which is permitted to adjust itself to its seat in closing, a valve-cam, and compensating means in the train of connections between the two comprising a rolling shoe which by its rocking motion compensates for variations in distance between cam and valve and obviates slack or looseness.

5. A valve-motion containing a valve which is permitted to adjust itself to its seat in closing, a valve-cam, a cam-follower, and compensating means comprising a rolling shoe between the cam-follower and valve adapted by its rolling motion to compensate for differences in distance between said cam-follower and the valve.

6. A valve-motion comprising a valve which is permitted to adjust itself to its seat in closing, a valve-cam, a push-rod, and compensating means comprising a rolling shoe between valve and push-rod which by its rolling motion compensates for any variation in distance between the two and keeps in constant engagement with the parts at both sides of it.

7. A valve-motion comprising an actuating cam, a plunger or push-rod, a valve, and a rocking shoe between the push-rod and valve, the said shoe maintaining constant contact between its surface and an opposing surface, one of the said surfaces being curved so as to allow the shoe to rock and thereby accommodate itself to varying distances between the push-rod and the valve-stem.

8. A valve-motion comprising a cam, a push-rod, a valve, and an expansion-joint intermediate said push-rod and valve comprising a head in connection with one thereof, a shoe engaged with the other thereof and in rolling or rocking engagement with said head, and a spring engaging with said rocking shoe and acting with a tendency to expand the joint by rocking the shoe.

In testimony whereof I affix my signature in presence of two witnesses.

FRANK W. MERRICK.

Witnesses:
CHAS. F. RANDALL,
E. A. BARTZSCH.